Oct. 21, 1969 R. W. WILSON 3,473,907
METHOD OF FORMING TUBING BY SURFACE PRESSURE DIFFERENTIAL
Filed Sept. 15, 1965
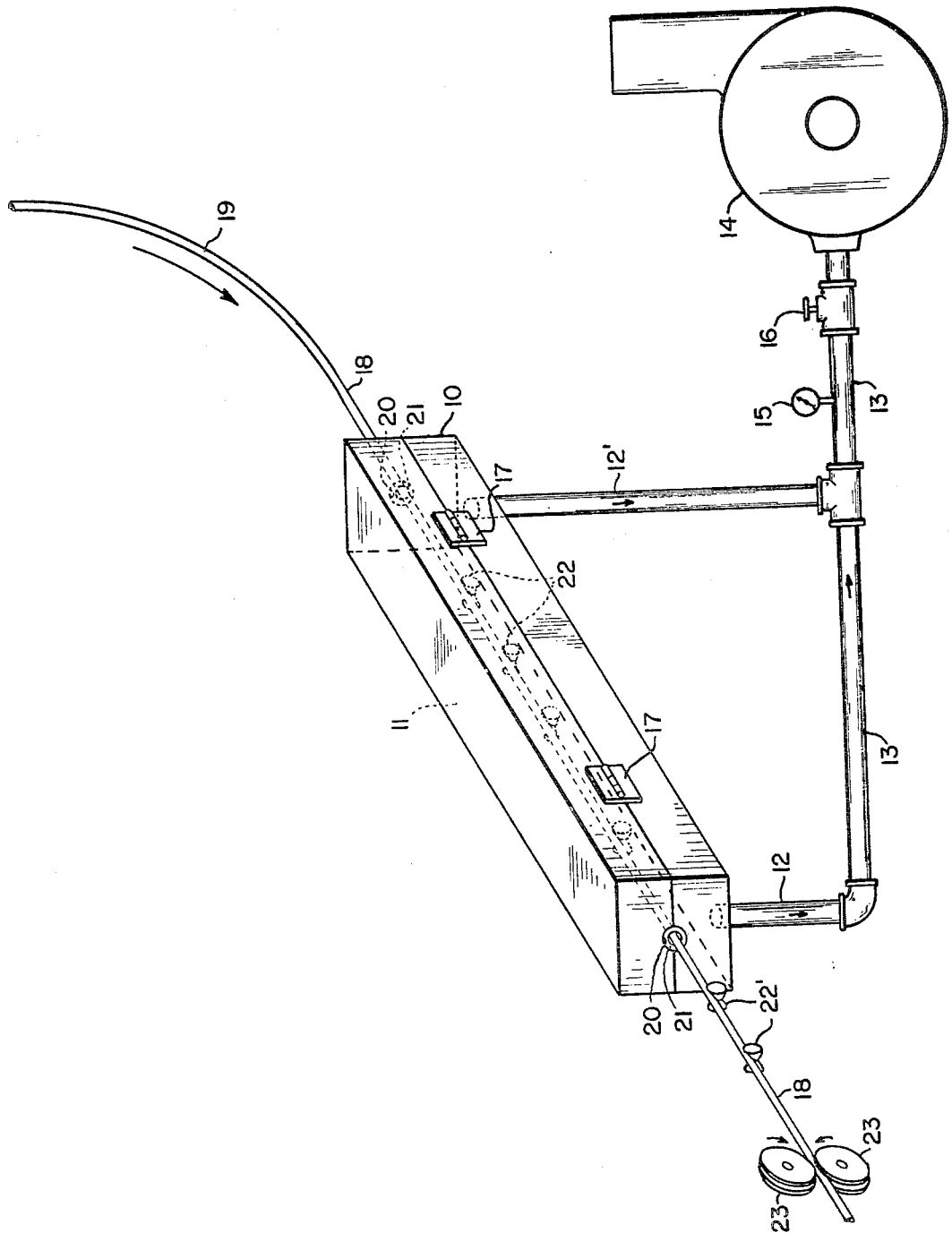
INVENTOR.
Richmond W. Wilson
BY
ATTORNEY

United States Patent Office 3,473,907
Patented Oct. 21, 1969

3,473,907
METHOD OF FORMING TUBING BY SURFACE PRESSURE DIFFERENTIAL
Richmond W. Wilson, Corning, N.Y., assignor to Corning Glass Works, Corning, N.Y., a corporation of New York
Filed Sept. 15, 1965, Ser. No. 487,400
Int. Cl. C03b 15/18
U.S. Cl. 65—87                  2 Claims

ABSTRACT OF THE DISCLOSURE

Uniformity of roundness is provided in newly formed glass tubing by subjecting outer surface portions of such tubing, while supported in a plastic state free of sizing restrictions, to subatmospheric pressure and simultaneously setting up such tubing while continuing the application of the subatmospheric pressure to create improved tubular uniformity and prevent distortion.

---

This invention relates to a novel method of continuously producing glass tubing having improved uniformity of roundness, and further to a process for forming uniformly round glass tubing of a relatively large diameter not heretofore obtainable with the conventional Vello tube drawing process.

In the conventional Vello tube drawing process, molten glass is passed through an annular space between a vertical mandrel and a refractory ring which is set in the bottom of a special forehearth called a "bowl." The tubing is drawn vertically downwardly from between the vertical mandrel and refractory ring, and passed through a catenary curve to the horizontal where it is then carried along asbestos-covered rollers to a cutting machine which separates the tubing into desired lengths. Air many be blown through the center of the mandrel to maintain an open bore centrally of the tubing.

By varying the air pressure applied to the inside of the tubing, with the outside thereof remaining at atmospheric pressure, it was possible to provide some degree of controlling the tube diameter and wall thicknesses. However, this procedure has not been completely satisfactory since it possesses several inherent disadvantages. For example, since the pressure inside the tubing is a result of "back pressure" developed by the flow of air through the tubing over its entire length, any variation in diameter such as a pinching or other constriction would produce an excessive back pressure, whereas a cutting-off of long lengths of tubing or broken ends would cause a pressure drop; with both situations producing extreme pressure variations within the newly formed semi-molten tubing resulting in an undulating cross-sectional diameter along the length of the formed tubing.

In addition, it became increasingly difficult to obtain sufficient back pressure inside the tubing when producing larger diameter tubing on the Vello process. Large quantities of air necessary to provide the desired result could not conveniently be provided through the inherently restricted opening in the mandrel, and such restriction seriously hampered regulating the air pressure. Further, the introduction of this large quantity of air cooled the shaft and bell, and induced collateral problems such as siding and devitrification. Accordingly, it was not possible to feasibly apply high amounts of blowing air required to produce the necessary back pressure. Therefore it was impossible to produce acceptable larger diameter tubing on the Vello process since there was insufficient pressure within the tubing to prevent it from collapsing or flattening out under its own weight when transported horizontally on the rollers, and accordingly unacceptable out-of-round tubing resulted.

Although vacuum has been utilized in forming molds in the past, for the purpose of facilitating forming and controlling dimensional accuracy during forming at the mold itself, to my knowledge there has been no suggestion in the prior art of utilizing a vacuum along the draw at a point remote from the forming means to provide cylindrical uniformity and prevent out-of-roundness immediately prior to the setting up of the tubing. Basically, my invention incorporates the utilization of a vacuum chamber along the draw of glass tubing so as to provide a high pressure differential between the interior and exterior surfaces of the tube to prevent distortion, such as out-of-roundness due to sagging or collapsing of the tubing walls.

The chamber is preferably positioned along the horizontal travel of the glass tubing adjacent its catenary curve, since the tubing passing therethrough must be in a plastic or semi-plastic state to be operatively acted upon by the vacuum. As the tubing passes through the vacuum chamber, the interior or bore of the tubing is open at one end to the atmosphere and may, if desired, have positive pressure applied through the longitudinal bore. The exterior surface thereof, however, is simultaneously surrounded by and subjected to a substantial vacuum so that the plastic or semi-molten tube has a tendency to expand radially outwardly in all directions and form a circular uniform cross section, thus providing cylindrically uniform tubing.

It thus has been an object of the present invention to provide a novel method of continuously producing glass tubing having substantially uniform transverse cross section along its longitudinal extent.

A further object of the invention has been to provide a method of forming relatively large diameter glass tubing having improved cylindrical uniformity not heretofore obtainable with conventional known types of tube draws by subjecting the inner and outer surfaces of such tubing while in a plastic but viscous state to a substantial pressure differential so as to prevent distortion and out-of-roundness.

An additional object of the invention has been to provide a method of producing glass tubing wherein the outer surface of such tubing, while in a plastic or semi-plastic state, is surrounded by and subjected to a vacuum so as to cause atmospheric or positively applied pressure within the bore of such tubing to relatively exert a radially-outward pressure in all directions and form tubing having a uniform circular cross section.

These and other objects of my invention will become apparent to those skilled in the art from the following specification and drawing illustrating a preferred embodiment thereof.

The figure is a somewhat schematic illustration of a means for carrying out the novel method set forth in the instant invention of providing tubing with improved cross-sectional uniformity.

An enclosure 10 forming a vacuum chamber 11 is shown provided with suitable conduits 12, 12' communicating therewith adjacent opposite ends thereof. The conduits 12, 12' are connected to a header 13 which is provided with an exhaust fan or vacuum pump 14. A suitable gauge 15 and a regulator valve 16 may be connected to the header as desired.

The enclosure 10 is preferably formed in two parts and provided with a pair of hinges or the like 17 so that the same may be opened to initially receive newly formed glass tubing in a horizontal plane after having passed through its catenary curve 19. The enclosure 10 is provided with a plurality of aligned open portions 20 at its opposite ends which may be provided with a suitable iris or asbestos closure 21 to compensate for various diameter tubing and prevent any substantial vacuum loss through such openings. A plurality of supporting rollers 22 positioned within the closure 10, and rollers 22' positioned exteriorly thereof, support the tubing 18 for travel along a substantially horizontal plane. A pair of conventional variable speed pulling rollers 23 may be utilized to control the rate of draw.

In operation, newly formed tubing 18, such as may be produced by a Vello downdraw, passes from a vertical to a horizontal plane through a catenary curve 19 while the tubing is still in a semimolten or plastic state. The closure 10 is opened so as to facilitate the initial feeding of the tubing 18 through the openings 20 and along supporting rollers 22. The rate of pull may be preset by the variable speed pulling rollers 23.

A predetermined degree of vacuum or subatmospheric pressure is then applied to the vacuum chamber 11 adjacent each end of the closure 10 by means of conduits 12 and 12', header 13, and vacuum pump 14. The degree of vacuum as indicated by gauge 15 may be controlled by regulator valve 16. In order to compensate for various diameter tubing which may be passed through the closure 10, and prevent undue loss of vacuum within the chamber 11, suitable adjustable closure means 21 may surround tubing 21 in spaced relation thereto and partially close off openings 20.

The vacuum chamber 11 is preferably positioned so as to support the tubing in a substantially horizontal plane. Further, since the tubing must still be in a plastic or semimolten state in order for the pressure differential created by the vacuum chamber to provide the desired results, the chamber 11 is preferably positioned adjacent the catenary curve so that the tubing when entering the vacuum chamber 11 is approximately at its softening point. Since the interior bore of the tubing is open to at least atmospheric pressure and may have positive pressure applied thereto, the vacuum applied to and surrounding the exterior surface of the tubing results in a pressure differential between the interior and exterior surfaces of the tubing, which differential is constant about the circumference thereof whereby a radially-outward force is exerted equally in all directions on the tubing walls. Accordingly distortion and out-of-roundness, heretofore inherent in such tubing formation due to such causes as sagging under its own weight, variable wall thicknesses, and so forth, have been eliminated. Although the present invention improves or virtually eliminates out-of-roundness on all tubing, it is particularly advantageous in producing improved circular cross-sectional uniformity in tubing above one inch diameter, which heretofore had a tendency to partially collapse upon itself while in its plastic state.

The length of the vacuum chamber, pull rate, and degree of vacuum are adjusted so that the tubing will have set up or be in a semi-rigid state when it is removed from the exit end of the vacuum chamber. The cross-sectional dimensions of the closure 10 are completely arbitrary so long as the supporting rollers 22 located therewithin are free to rotate. The length of the closure will of course vary with the rate of draw, but should be long enough so that by the time the tubing leaves the closure it has cooled sufficiently and set up to thereby minimize any further deformation. Although not limiting, vacuum chambers having a length of from 2 feet to 30 feet have been found to provide operable results. In a like manner, the degree of vacuum used has varied from approximately 4 inches of water to approximately 24 inches.

When drawing tubing having an outside diameter of ½ inch at a rate of 10 pounds per minute it was found that a vacuum chamber 7 feet long, positioned adjacent the catenary of the tubing, and provided with a vacuum of 18 inches of water column produced tubing having improved cross-sectional circular uniformity along its longitudinal extent. In a like manner, when manufacturing tubing having a ½ inch outside diameter at a rate of 50 pounds per minute, it was found that a 30 foot long vacuum chamber horizontally positioned adjacent the catenary of the tubing and provided with a vacuum of 20 inches of water column produced improved cylindrical uniformity along its longitudinal extent.

I claim:

1. A method of forming glass tubing having improved cylindrical uniformity which comprises, initially forming hollow tubing from molten glass, withdrawing such tubing from the forming area, creating a pressure differential between the inner surface and outer surface of a portion of such withdrawn tubing while still in a plastic state so as to effect an equal omnidirectional radially-outward force on such tubing, maintaining said tubing in spaced-apart relation from contacting any confining surface portions so that said pressure differential may freely act upon wall portions of said tubing, and withdrawing the tubing at such a rate to set up said tubing while subjected to such pressure differential and thereby minimize any further deformation.

2. A method of forming glass tubing having improved circular cross-sectional uniformity along its longitudinal extent which comprises, initially forming hollow tubing from molten glass, drawing such tubing along a substantially horizontal path, subjecting the outer surface of a longitudinal section of such horizontal tubing while still in a plastic state to subatmospheric pressure while simultaneously supplying the inner surface of such tubing with at least atmospheric pressure so as to create a radially-outwardly exertable pressure differential between the inner surface and outer surface of such tubing, maintaining such tubing free from contact with exterior sizing restriction surfaces while subjected to such subatmospheric pressure so that wall portions thereof may be freely rounded by the radially-outwardly exerted pressure differential, controlling the rate of draw so that such tubing is substantially solidified with cylindrical uniformity before it is withdrawn from the effect of the subatmospheric pressure, and controlling the degree of subatmospheric pressure applied to such tubing.

References Cited

UNITED STATES PATENTS

| 1,766,638 | 6/1930 | Howard | 65—87 XR |
| 1,892,126 | 12/1932 | Bailey | 65—187 XR |

FOREIGN PATENTS

| 1,356,644 | 2/1964 | France. |
| 685,037 | 4/1964 | Canada. |

S. LEON BASHORE, Primary Examiner

F. W. MIGA, Assistant Examiner

U.S. Cl. X.R.

65—32, 157, 187, 296